United States Patent
Sugiura et al.

(10) Patent No.: US 7,526,369 B2
(45) Date of Patent: Apr. 28, 2009

(54) PEDESTRIAN DETECTION DEVICE, RELATED METHOD, AIR BAG SYSTEM AND VEHICLE EQUIPPED WITH AIR BAG SYSTEM

(75) Inventors: Makiko Sugiura, Hekinan (JP); Inao Toyoda, Anjo (JP)

(73) Assignee: DENSO CORPORATION, Kariya (JP)

( * ) Notice: Subject to any disclaimer, the term of this patent is extended or adjusted under 35 U.S.C. 154(b) by 725 days.

(21) Appl. No.: 11/033,481

(22) Filed: Jan. 12, 2005

(65) Prior Publication Data

US 2005/0182540 A1 Aug. 18, 2005

(30) Foreign Application Priority Data

Jan. 13, 2004 (JP) ............................. 2004-005462

(51) Int. Cl.
*G06F 19/00* (2006.01)

(52) U.S. Cl. .................. 701/36; 701/1; 701/45; 701/301; 340/436; 340/901; 340/903; 342/118; 342/70; 342/109; 356/4.01; 356/4.03; 702/141; 702/149; 702/159

(58) Field of Classification Search .............. 701/1, 701/36, 45–47, 301; 340/436, 901, 903, 340/435, 556; 280/735, 728.1; 356/4.01, 356/4.03, 5.01–5.04, 28; 702/141–143, 149; 702/159

See application file for complete search history.

(56) References Cited

U.S. PATENT DOCUMENTS

| 5,963,148 A | * | 10/1999 | Sekine et al. | ............... 340/905 |
| 6,784,792 B2 | * | 8/2004 | Mattes et al. | ............... 340/436 |

FOREIGN PATENT DOCUMENTS

| JP | 11-28994 | 2/1999 |
| JP | A-2003-220973 | 8/2003 |

OTHER PUBLICATIONS

Notification of Reasons for Refusal dated Jun. 26, 2007 in corresponding Japanese Patent Application No. 2004-005462 (and English translation).

* cited by examiner

*Primary Examiner*—Khoi Tran
*Assistant Examiner*—Nikhil Sriraman
(74) *Attorney, Agent, or Firm*—Posz Law Group, PLC

(57) ABSTRACT

A pedestrian detection device, a related method, an air bag system and a vehicle are disclosed. The pedestrian detection device 20 includes an infrared ray sensor 30A, which detects a temperature of a detection object approaching to or in contact with the vehicle 10 to provide a temperature signal, an impact sensor 27a to 27c, which generate impact signals when the vehicle encounters a collision, and an impact collision generation unit 21 operative to generate a pedestrian collision signal upon discrimination that the detection object is a pedestrian, discrimination that the impact signal is being outputted, and discrimination that a direction in which the pedestrian is present and a direction in which the impact is applied to the vehicle falls in a substantially same direction.

8 Claims, 4 Drawing Sheets

PEDESTRIAN DETECTION DEVICE, RELATED METHOD, AIR BAG SYSTEM AND VEHICLE EQUIPPED WITH AIR BAG SYSTEM

CROSS REFERENCE TO RELATED APPLICATIONS

This application is related to Japanese Patent Application No. 2004-005462 filed on Jan. 13, 2004, the content of which is hereby incorporated by reference.

BACKGROUND OF THE INVENTION

1. Field of the invention

The present invention relates to a pedestrian detection device that detects a collision between a vehicle and a pedestrian, an air bag associated with the pedestrian detection device, and a vehicle equipped with the air bag system.

2. Description of the Related Art

In the related art, a pedestrian detection device, adapted for installation on a vehicle to detect a collision between the vehicle and a pedestrian, has been proposed as disclosed in Japanese Patent Provisional Publication No. 11-28994 (on pages 2 to 6 and in FIGS. 1 to 17).

With such a disclosed technology, a load sensor or displacement sensor are mounted to an inside of a bumper of the vehicle to provide output signals and a vehicle speed sensor is mounted to the vehicle to provide a vehicle speed signal. Depending on signal waveforms outputted from the load sensor or the displacement sensor, mounted inside the front bumper, and a signal waveform outputted from the vehicle speed sensor, discrimination is made to find whether the vehicle collides with the pedestrian or a stationary object utilizing a concept in that if a detecting object is a pedestrian, the signal waveform of the load sensor, generated when the pedestrian collides with the vehicle, is restored to its original state at faster time than that generated when the vehicle collides with the stationary object, such as the other vehicle, a wall, a standing timber and a utility pole (hereinafter merely referred to as the stationary object) as disclosed in the above Patent Literature on paragraphs 0027 to 0032.

Such a related art technology is based on a concept in that the signal waveform of the load sensor or the displacement sensor, generated when the pedestrian collides with the vehicle, is continuously generated for a time period shorter than that of a signal waveform generated when the vehicle collides with the stationary object and has an output level lower than that of the signal waveform associated with the stationary object. Depending on such a concept, the signal waveform is arranged to have a given range in a time period for which the sensor output is continuously generated and another given range in an output level of the sensor output to allow discrimination to be made, when the sensor output delivered from the load sensor falls in the given ranges, that the pedestrian collides with the vehicle.

Therefore, in cases where the signal waveform of the sensor output is out of such a given range, an issue arises wherein even in the occurrence of the collision between the pedestrian and the vehicle, the pedestrian detection device erroneously detects that such a collision is associated with the stationary object with the resultant difficulty in correctly detecting the collision associated with the pedestrian. Also, under circumstances where the signal waveform of the load sensor lies in such a given range, another issue comes out wherein if the stationary object has a characteristic closely related to the pedestrian in terms of a mass and rigidity, the pedestrian detection device erroneously detects the collision associated with the pedestrian even in the absence of the collision associated with the pedestrian.

SUMMARY OF THE INVENTION

The present invention has been completed with a view to addressing detection device, a related method, an air bag system and a vehicle equipped with such an air bag system that can prevent erroneous detection of a pedestrian encountered with a collision.

To achieve the above object, according to one aspect of the present installation on a vehicle for detecting a collision between the vehicle and a pedestrian, comprising a temperature detector for detecting a temperature of a detecting object approaching to or in contact with the vehicle to output temperature information, and an impact detector for detecting an impact encountered by the vehicle to output impact information. An impact information generation unit is operative to make first discrimination in response to the temperature information that the detecting object is the pedestrian and second discrimination in response to the impact information that the impact information is being outputted for thereby generating pedestrian collision information indicative of the pedestrian encountered in the collision.

With such a structure, the temperature detector detects the temperature of the detecting object approaching to or in contact with the vehicle to output temperature information and the impact detector detects the impact applied to the vehicle to output the impact information. The impact information generation unit is responsive to the temperature information to detect that the detecting object is the pedestrian and also responsive to the impact information to generate the pedestrian collision information, Thus, under circumstances where discrimination is made based on temperature information that the detection object is the pedestrian and discrimination is made that impact information is outputted, the impact information generation unit generates pedestrian collision information indicative of a collision associated with the pedestrian. Accordingly, even if the collision is associated with a stationary object having characteristics closely related to the pedestrian in terms of a mass and rigidity, no judgment is made that the detection object is the pedestrian and the collision associated with the pedestrian can be reliably detected. Thus, this enables the prevention of erroneous detection of the collision encountered by the pedestrian in a highly reliable manner.

According to another aspect of the present invention, the temperature detector includes direction-detecting means for detecting a direction, in which the detection object is present, to output presence-direction information. In response to the presence-direction information and the impact information, if the impact information generation unit discriminates that the direction, detected by the temperature detector, in which the detection object is present and a direction to which the impact is applied falls in a substantially same direction, the impact information generation unit generates the pedestrian collision information. Thus, if the impact is applied to the vehicle in a direction different from the direction in which the detection object is present, no pedestrian collision information is generated. Therefore, if the direction in which the pedestrian approaches to the vehicle and the direction in which the vehicle is applied with the impact by a stationary object, such as a standing timber, differs from each other, no pedestrian collision information is generated. Consequently, even in cases where the pedestrian concurrently approaches to the vehicle in a direction different from that in which the impact is applied to the vehicle due to the stationary object, erroneous detection can be reliably prevented.

According to another aspect of the present invention, the pedestrian detection device further comprises vehicle speed detection means for detecting a traveling speed of the vehicle to output vehicle speed information. The impact information generation unit is also operative to make, in addition to the first to third discriminations, a fourth discrimination in response to the vehicle speed information that the vehicle is traveling for thereby generating the pedestrian collision information.

With such another aspect, the pedestrian collision information is generated under a situation wherein the vehicle is found to be moving and under a situation wherein the vehicle is not moving, that is, when the vehicle is parking, no pedestrian collision information is outputted. Thus, the pedestrian detection device is enabled to exhibit a function with a focus on a phase, wherein the vehicle is moving, which constitutes the most typical cases for the pedestrians to encounter traffic accidents. Accordingly, erroneous detection of the collision encountered by the pedestrian can be reliably prevented in line with the most realistic traffic accidental cases.

According to another aspect of the present invention, the pedestrian detection device features that the temperature detector and the impact detector are mounted to at least one of a front area and a rear area of the vehicle.

With such a structure, since the temperature detector and the impact detector are mounted to at least one of the front area and the rear area of the vehicle, the pedestrian detection device is able to reliably detect the occurrence of the pedestrian encountered in the collision at the front and rear areas of the vehicle. Thus, the pedestrian detection device is enabled to function not only for the collision of the pedestrian at the front area of the vehicle in the most typical traffic accidental cases associated with the pedestrians but also for the collision encountered at the rear area of the vehicle. Therefore, erroneous detection of the collision associated with the pedestrian can be reliably prevented not only for the vehicle is moving forward but also for the vehicle being moving backward.

According to another aspect of the present invention, the impact detector includes a plurality of impact detection means mounted to a bumper of the vehicle at given positions thereof to detect impact forces applied thereto, respectively, thereby outputting the impact information depending on detected impact forces.

With such a structure, since the impact detector means are located at the given positions of the bumper of the vehicle, the collision of the pedestrian can be detected in an increased detection range for reliably alleviating the impacts encountered by the pedestrian during the collision with the vehicle.

According to another aspect of the present invention, the impact detection means include physical quantity sensors, respectively, by which magnitudes of impact forces are detected.

With such a structure, since the physical quantities of the impact can be detected, the collision between the pedestrian and the vehicle can be reliably detected.

According to another aspect of the present invention, there is provided a method of detecting a collision between the vehicle and a pedestrian The method comprises detecting a temperature of a detection object approaching to or in contact with the vehicle to output temperature information, and detecting an impact encountered by the vehicle to output impact information. Discrimination is made in response to the temperature information and the impact information to find whether the detection object is the pedestrian and whether the impact information is being outputted, thereby generating pedestrian collision information indicative of the pedestrian encountered in the collision.

With such a method, under a situation wherein discrimination is made in response to the temperature information that the detection object is the pedestrian and discrimination is made that the impact information is outputted, the pedestrian collision information is generated. Thus, even if a stationary object, closely related to the pedestrian in terms of a mass and rigidity, collides with the vehicle, the collision between the pedestrian and the vehicle can be reliably detected with no erroneous detection in a simple manner.

According to a further aspect of the present invention, an air bag system comprises a pedestrian detection device installed on a vehicle for detecting a collision between the vehicle and a pedestrian to generate pedestrian collision information, an air bag controller installed on the vehicle and generating an activation signal in response to the pedestrian collision information, and an air bag installed on the vehicle to be deployed in response to the pedestrian collision information for alleviating an impact applied to the pedestrian. The pedestrian detection device comprises a temperature detector for detecting a temperature of a detection object approaching to or in contact with the vehicle to output temperature information, an impact detector for detecting an impact encountered by the vehicle to output impact information, and an impact information generation unit operative to make a first discrimination in response to the temperature information that the detection object is the pedestrian and a second discrimination in response to the impact information that the impact information is being outputted for thereby generating pedestrian collision information indicative of the pedestrian encountered in the collision.

With such a structure, since the collision between the pedestrian and the vehicle can be reliably detected in response to the temperature information and the impact information, the air bag can be reliably deployed to alleviate the impact encountered by the pedestrian for protection thereof Also, the air bag system is comprised of a less number of component parts, enabling the production at low costs.

BRIEF DESCRIPTION OF THE DRAWINGS

For a better understanding of the present invention and to show how the same may be carried into effect, there will now be described by way of example only, specific embodiments according to the present invention with reference to the accompanying drawings, in which:

FIGS. 2A and 2B are schematic views for illustrating positions in which physical quantity sensors and infrared ray sensors are located in a vehicle, with FIG. 2A showing an example in which the infrared ray sensors are mounted in a front bumper while FIG. 2B shows an example in which the infrared ray sensors are mounted to a rear side of a back mirror;

DETAILED DESCRIPTION OF THE PREFERRED EMBODIMENTS

Now, referring to FIGS. 1A to 4, a pedestrian detection device of an embodiment according to the present invention is described with reference to an exemplary case as applied to an air bag system of a vehicle for protecting a pedestrian.

Figure 1A:
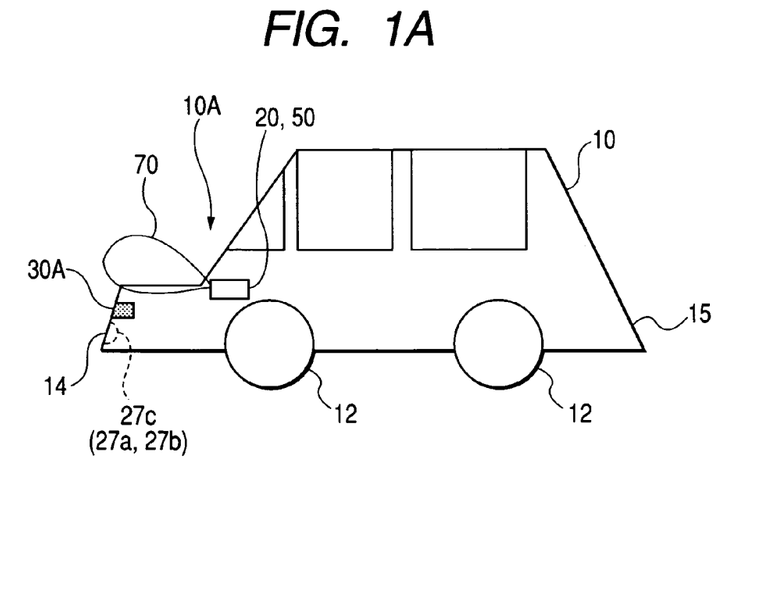
FIG. 1A is a schematic view illustrating a general structure of an air bag system for a vehicle to which a pedestrian detection device of an embodiment according to the present invention is applied.

As shown in FIG. 1A, an air bag system 10A is installed on a vehicle 10 and mainly comprised of a pedestrian detection device 20, an air bag controller 50 and an air bag 70. Such a structure enables the air bag 70 to be deployed at a position inside or outside an engine hood for thereby alleviating impacts encountered by the pedestrian when the vehicle 10 collides with the pedestrian (not shown).

More particularly, for instance, the pedestrian detection device 20 detects the occurrence of a collision between the pedestrian and the vehicle 10 to output pedestrian collision information to the air bag controller 50, which consequently activates the air bag 70 or an engine-hood lifting mechanism (not shown). This allows the air bag 70 to be deployed inside or outside an engine hood that is lifted up by the engine-hood lifting mechanism, making it possible to alleviate impacts encountered by the pedestrian.

Figure 1B:
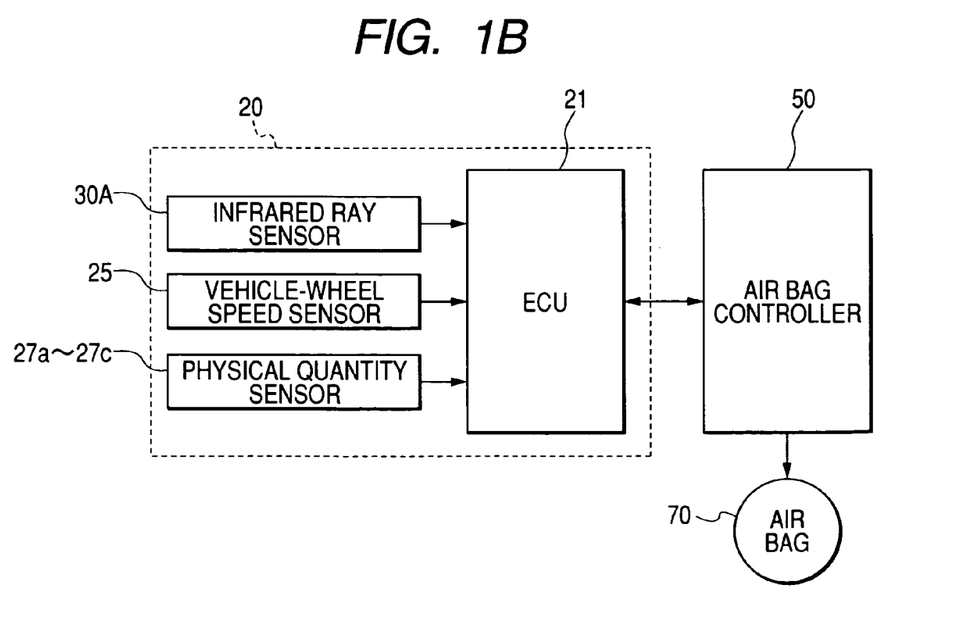
FIG. 1B is a block diagram illustrating a structure of the pedestrian detection device connected to the air bag system.

Referring to FIG. 1B, the pedestrian detection device 20 of the presently filed embodiment is described in detail, As shown in FIG. 1B, the pedestrian detection device 20 is comprised of a vehicle-wheel speed sensor 25 for detecting a speed of a vehicle wheel, an infrared ray sensor 30A, which detects a temperature of a detection object, such as the pedestrian in closely approaching to or in contact with the vehicle 10, physical quantity sensors 27a, 27b and 27c that detect the occurrence of impacts to generate impact information, and an ECU (Electric Control Unit) 21 that serves to generate pedestrian collision information, indicative of the pedestrian colliding with the vehicle 10, upon discrimination in response to temperature information that the detection object is a pedestrian and discrimination in response to output signals from the physical quantity sensors 27a to 27c that impact information is being outputted.

The ECU 21 comprises an ASIC (Application Specification Integrate Circuit) type microcomputer that is comprised of a CPU (Central Processing Unit) (not shown), a RAM (Random Access Memory), a ROM (Read on Memory), an I/O (Input/Output Interface) and a communication interface (not shown). The CPU has a structure that is connected to the vehicle-wheel speed sensor 25, the physical quantity sensors 27a to 27c and the infrared ray sensor 30A through the I/O and connected to the air bag controller 50 via the communication interface. The ECU serves as an impact information generation unit.

The vehicle-wheel speed sensor 25 is mounted to the vehicle 10 in an area close proximity to a vehicle wheel 12 and serves as a detector for detecting a rotational speed of the vehicle wheel 12 to generate a vehicle-wheel speed signal (as vehicle speed information) which in turn is outputted to the ECU 21. The ECU 21 operates in response to the vehicle-wheel speed signal inputted from the vehicle-wheel speed sensor 25 to discriminate whether the wheel 12 of the vehicle 10 is in rotation for thereby discriminating whether the vehicle 10 is traveling (running). Thus, the vehicle-wheel speed sensor 25 serves as a vehicle speed detector.

Further, with such a structure of the presently filed embodiment wherein the rotational speed of one vehicle wheel 12 is rotated, only the presence of or the absence of the movement of the vehicle 10 or only a rough estimate value of the vehicle speed (a traveling speed of the vehicle 10) can be obtained. Therefore, in order to calculate a correct vehicle speed, there is a need for two vehicle-wheel speed sensors 25 to be located in two positions closely related to the vehicle wheels 12 (involving the vehicle wheel 12 located in a front and right area of the vehicle 10 and the vehicle wheel 12 located in a rear and left area of the vehicle 10). In this case, the two vehicle-wheel speed sensors 25 are placed on a diagonal line of the vehicle 10 to allow vehicle-wheel speed signals to be generated in two systems under which a vehicle speed is calculated.

Figure 2A:
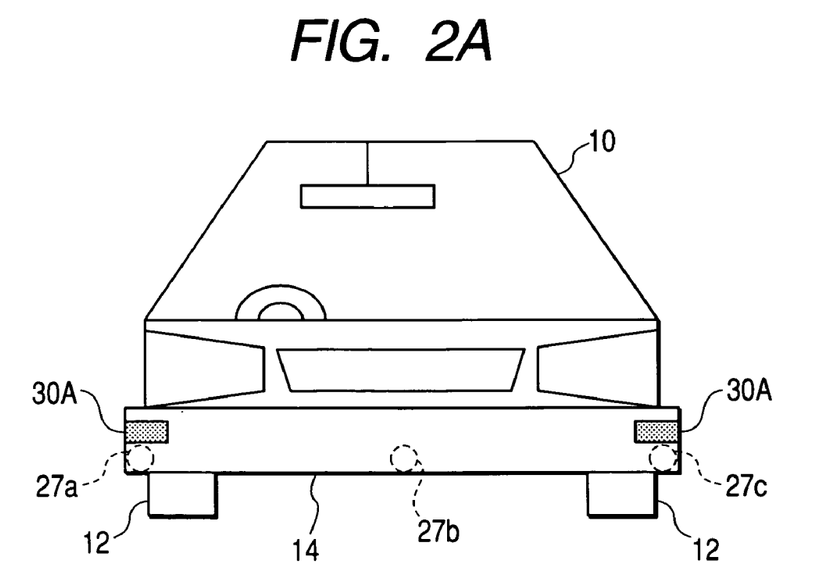
Figure 2B:
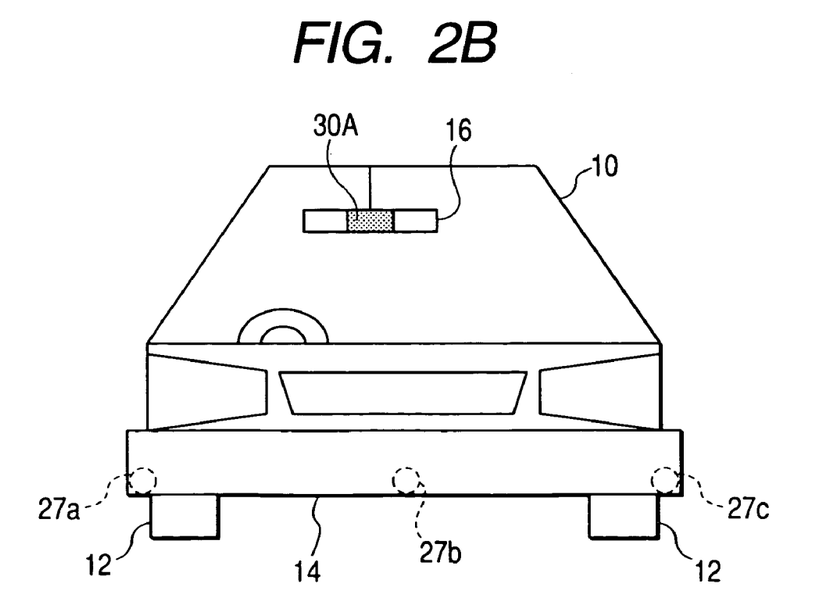

The physical quantity sensors 27a to 27c detect physical quantities of impact forces exerted from an outside to output impact signals (as impact information) to the ECU 21 and may include, for instance, acceleration sensors, displacement sensors and pressure sensors or the like. The physical quantity sensors 27a to 27c serve as an impact detector. These physical impact sensors 27a to 27c are mounted inside a front bumper 14 of the vehicle 10. For instance, as shown in FIGS. 2A and 2B, the physical quantity sensors 27a, 27b and 27c are embedded in the front bumper 14 at a front and right area, a front and substantially central area and a front and left area thereof, respectively.

With such a structure, under a condition where the detection object collides with a front of the vehicle 10 at a substantially front face, a substantially rightward area or a substantially leftward area thereof, the physical quantity sensors 27a to 27c are able to detect impact forces applied by the relevant detection object. Further, like the presently filed embodiment, in cases where a plurality of physical quantity sensors 27a to 27c are embedded in the front bumper 14, each of the physical quantity sensors 27a to 27c outputs an impact signal representing physical quantities of an impact force as parameters indicative of characteristics thereof. For instance, the physical quantities may include a magnitude (in terms of an output voltage value depending on the magnitude of the impact) of the impact signal, an output timing at which the impact signal is outputted, a time period in which the impact signal continues to be generated and a delay time between the collision of the detection object and the generation of the impact signal.

The impact signals, containing such parameter information, are delivered to the ECU 21. Thus, the ECU 21 executes calculating operations to analyze the magnitudes, the output timings, the time periods in which the impact signals are generated, and the delayed times of the impact signals, thereby enabling the detection of a direction, in which the relevant impact forces are applied to the vehicle 10, as impact-direction information.

Further, inside the ECU 21, waveform analysis is conducted to analyze the impact signals inputted from the physical quantity sensors 27a to 27c, thereby enabling further judgment from a mass or a rigidity (including a solidness and softness) of the detection object to find whether the detection object is a human being (person) or a stationary object.

The infrared ray sensor 30A serves as a detector that detects the amount of thermal energy resulting from heat rays radiated from the human being or an object other than the human being. To this end, the infrared ray sensors 30A may be mounted to the front bumper 14 at the left and right areas thereof, as shown in FIG. 2A. Alternatively, the infrared ray sensors 30A may be mounted to he rear side of the back mirror 16 as shown in FIG. 2B.

In general, due to the presence of the human being having a body temperature of approximately 36° C., if the ECU 21 is applied with the temperature signal indicative of temperatures falling in a range (a given temperature range) equal to or greater than 32° C. and equal to or less than 43° C., then, the ECU 21 discriminates that the detection object is a human being, that is, a pedestrian. In contrast, if the ECU 21 receives the temperature signal deviated from such a given temperature range, then, the ECU 21 discriminates that the detection object is not the human being but is an object, that is, a stationary object. Thus, the infrared ray sensor 30A serves as a temperature detector.

Figure 3A:
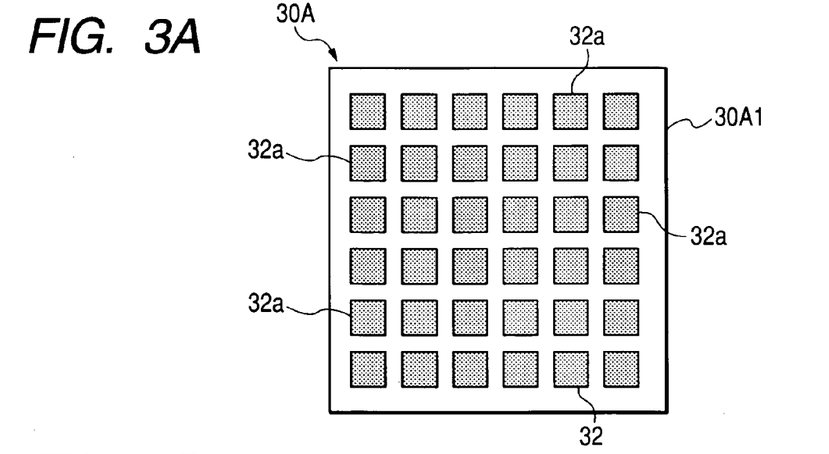
FIG. 3A is an enlarged structural view illustrating one example of the infrared ray sensor in which multiple infrared ray sensor elements are arrayed on a flat holder in a matrix pattern.
Figure 3B:
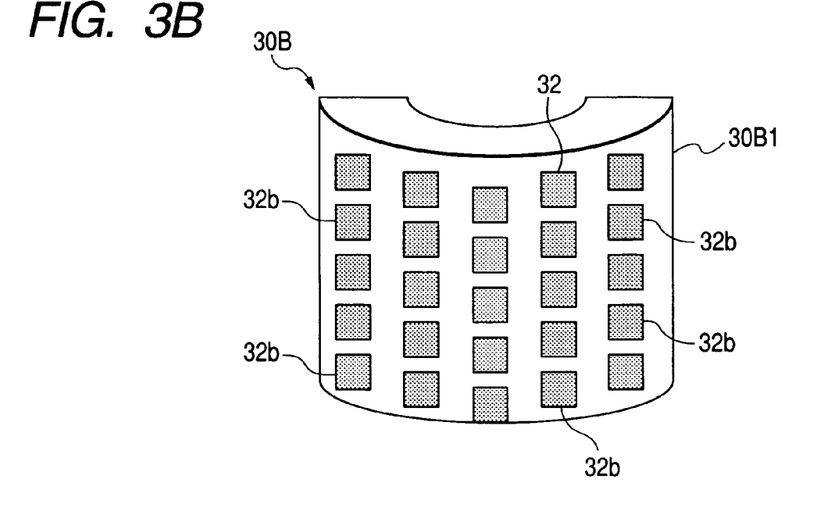
FIG. 3B is an enlarged structural view illustrating another example of the infrared ray sensor in which multiple infrared ray sensor elements are arrayed on a curved holder in a matrix pattern.
Figure 3C:
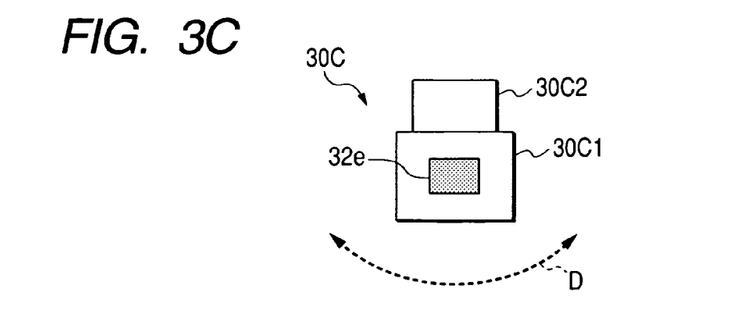
FIG. 3C is a schematic view of an exemplary structure in which an infrared ray sensor element with a single pixel is carried on a movable holder.

Also, the infrared ray sensor 30A may take various forms of structures that are exemplarily shown as infrared ray sensors 30A, 30B and 30C in FIGS. 3A to 3C, respectively.

As shown in FIG. 3A, the infrared ray sensor 30A is structured such that a flat holder 30A1, formed in a rectangular flat shape, carries a plurality of infrared ray sensor elements 32a in the form of unit pixels, that is, thirty six sensor elements 32a are arrayed on a two dimension with six lines and six rows in a matrix form.

In an alternative, shown in FIG. 3B, the infrared ray sensor 30B is structured such that a curved holder 30B1, formed in a rectangular curved shape, carries a plurality of infrared ray sensor elements 32b in the form of unit pixels, that is, twenty five sensor elements 32b are arrayed on a three dimension with five lines and five rows in a matrix form.

Thus, due to the presence of a layout wherein the plural infrared ray sensor elements 32a or 32b are arrayed in the matrix form, the infrared ray sensors 30A and 30B are able to catch a direction, in which the relevant detection object is present, based on respective signal distribution patterns of temperature signals detected by the infrared ray sensor elements 32a or 32b.

Also, due to a layout of the infrared ray sensor 30B with the infrared ray sensor elements 32b arrayed on the curved surface (in three dimension), an expanded detection range can be obtained. By applying plural temperature signals (indicative of presence-direction information) to the ECU 21, signal processing is executed by the ECU 21 and the direction in which the detection object is present can be obtained. Also, increasing the number of infrared ray sensor elements 32a or 32b, arrayed in the matrix form, enables improvement in a detecting precision.

Further, as shown in FIG. 3C, another alternative may take a structure wherein a single infrared ray sensor element 30e is mounted on a movable holder 30C1, which is made movable by an actuator 30C2 for moving capabilities in left and right directions, as shown by an arrow D within a given range of, for instance, 180 degrees. With such a structure, the direction, in which the relevant detection object is present, can be grasped based on a control signal of the actuator 30C2 and temperature signals outputted from the infrared ray sensor elements 32e. That is, the presence of the control signal, by which the actuator 30C2 is controlled, allows a front direction of the infrared ray sensor element 32e, whose direction is controlled by the actuator 30C2, enabling the direction (indicative of presence-direction information) in which the detection object is present based on direction information and temperature information outputted from the infrared ray sensor element 32e. With the infrared ray sensor 30C, since the infrared ray sensor element 32e is movable within the range of 180 degrees, the infrared ray sensor 30c has a capability of detecting the detection object in a wider range than that of the infrared ray sensor 30B. Also, the infrared ray sensor 30C is sufficed to be composed of a single infrared ray sensor element 32, resulting in a sensor at a low cost. Moreover, another alternative may include a structure wherein the movable holder 30C1 includes a plurality of infrared ray sensors elements 32 disposed in a matrix form as shown in FIG. 3A, thereby providing improved resolution of the directional detection.

Also, the infrared ray sensor 30A, shown in FIG. 3A, and the infrared ray sensor 30B, shown in FIG. 3B, may be mounted to the front bumper 14 of the vehicle 10 and the infrared ray sensor 30C, shown in FIG. 3C, may be mounted to the rear side of the back mirror 16 of the vehicle 10. This provides an ease of providing a matching between presence-direction information, resulting from the infrared ray sensors, and impact direction information, resulting from the physical quantity sensors 27a to 27c embedded in the front bumper 14 as set forth above, enabling reduction in erroneous detection.

Further, the infrared ray sensor 30C may be mounted to the rear side of the mirror 16 and, in this case, no probabilities occur for stains to adhere onto a surface of the infrared ray sensor element 32e, thereby enabling reduction in deterioration in detection capability of the infrared ray sensor element 32e. In addition, no object is present in an area between a rear area of the back mirror 16 and a frontal area of the vehicle 10 for interrupting heat rays except for a front glass, thereby eliminating erroneous detection of the detection object.

Further, in cases where the infrared sensor 30A, 30B, shown in FIGS. 3A and 3B, are mounted onto the rear side of the back mirror 16 in FIG. 2B, the physical quantity sensors 27a to 27c are embedded in the front bumper 14. In such a structure, as compared to the structure shown in FIG. 2A, a less matching is provided between presence-direction information, obtained from the infrared sensor, and impact position information resulting from the physical quantity sensors 27a to 27c of the front bumper 14. However, with a countermeasure undertaken to employ increased number of infrared ray sensor elements arrayed on the rear side of the mirror 16 in a matrix form, the occurrence of erroneous detection of the direction in which the detection object is present can be minimized without providing a movable section, such as the actuator 30C2, as required in the infrared ray sensor 30C.

Furthermore, while the physical quantity sensors 27a to 27c and the infrared ray sensors 30A to 30C have been described above as mounted on the front bumper 14 and the back mirror 16, the present invention is not limited to such particular structures and these component parts may be mounted onto a rear bumper 15 disposed in a rearward area of the vehicle 10 (see FIG. 1A). With such a structure, by permitting the air bag 70 to be mounted in a rear section of the vehicle 10, an air bag system, disposed in the rear area of the vehicle, can be activated even when the vehicle 10 moves backward and encounters a collision with a pedestrian. Also, while with the presently filed embodiment, the ECU 21 and the air bag controller 50 have been described with reference to a structure in which they are separately configured, the present invention is not limited to such a structure and, for instance, a function of the ECU 21 may be realized with the use of the air bag controller 50. This enables reduction in the number of component parts.

Now, a basic sequence of operations of detecting a pedestrian, to be executed by the microcomputer of the ECU 21, is described with reference to FIG. 4. Also, such pedestrian detecting operation is realized by repeatedly executing a pedestrian detection program, stored in the ROM constituting the microcomputer, for each given period of time (for instance, every for five milliseconds) by the CPU of the microcomputer through timer interruption techniques.

Figure 4:
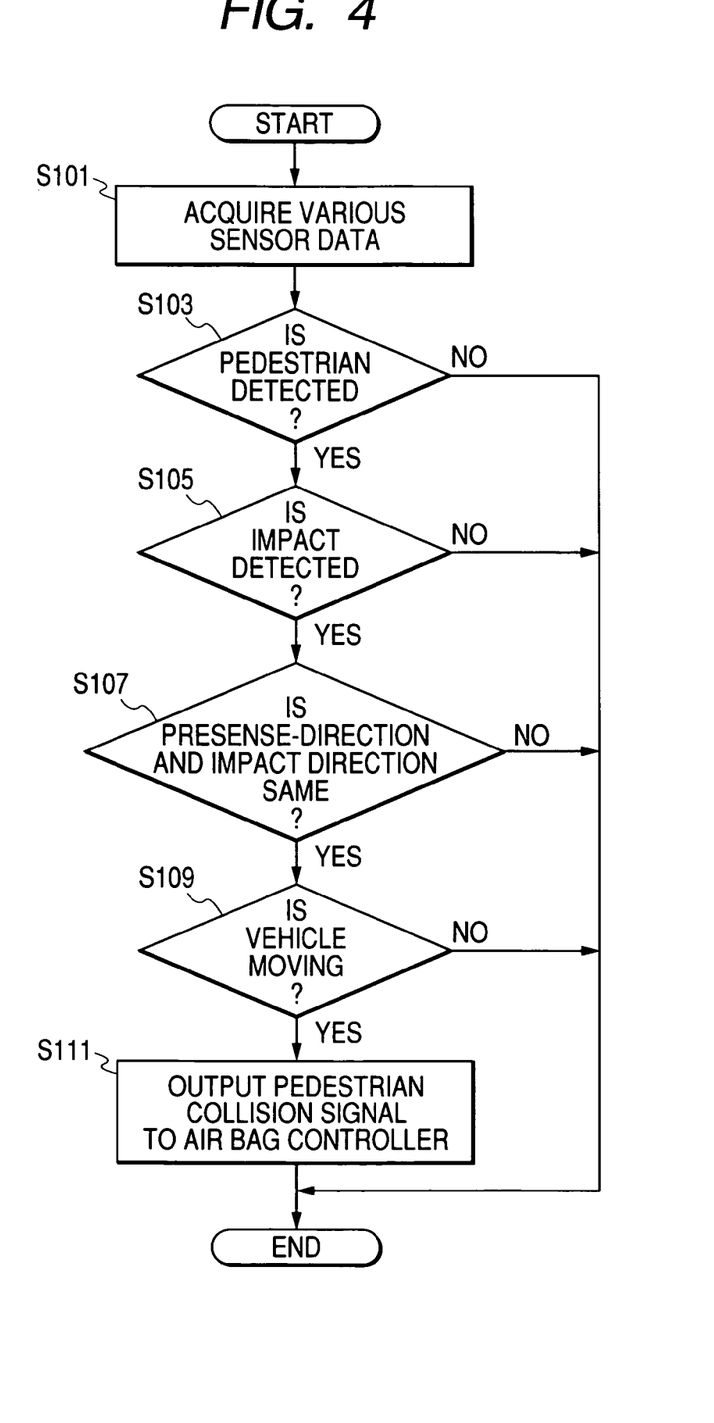
FIG. 4 is a flowchart for illustrating a basic sequence of operations for detecting a pedestrian to be executed by an ECU of the pedestrian detection device of the presently filed embodiment.

As shown in FIG. 4, when executing pedestrian detecting operation, after given initiating operation, detection data are obtained from various sensors in step S101. More particularly, the ECU 21 is applied with the temperature signal (temperature information) from the infrared ray sensor 30A, the impact signals (impact information) from the physical quantity sensors 27a to 27c, and the vehicle-wheel speed signal (vehicle speed information) from the vehicle-wheel speed sensor 25.

In succeeding step S103, the ECU 21 discriminates whether a pedestrian is detected by the infrared ray sensor 30a. That is, discrimination is made in response to the temperature signal (temperature information) delivered from the infrared ray sensor 30a acquired in step S101 to find whether the heat rays are radiated by the detection object. If the temperature resulting from the heat rays remains in a given range (with "YES" in step S103), it is highly probable that the detection object is a human being, that is, a pedestrian, and the operation proceeds to subsequent step S105. In contrast, if no discrimination is made that the temperature resulting from the relevant heat rays remains in a given range (with "NO" in step S103), it is probable that the relevant detection object is an object other than the human being, for instance, a stationary object, and no need arises for deploying the air bag 70. Therefore, the operation to detect the pedestrian is terminated.

In consecutive step S105, discrimination is made whether the physical quantity sensors 27a to 27c detect the impacts. That is, discrimination is made in accordance with the presence of or the absence of the impact signals (impact information to find whether the pedestrian (detection object) collides the vehicle 10). In this moment, if discrimination is made that the pedestrian encounters the collision (with "YES" in step S105) and the operation proceeds to succeeding step S107. On the contrary, if no discrimination is made that the pedestrian encounters the collision (with "NO" in step S105), it can be judged that no pedestrian collides the vehicle 10, and the pedestrian detecting operation is terminated.

In subsequent step S107, discrimination is made as to whether a direction in which the pedestrian is present and a direction to which the impact is applied fall in the same direction. That is, the ECU 21 executes the signal processing of the plural temperature signals (presence-direction information) acquired in step S101 for thereby determining the direction at which the pedestrian is present. Further, the ECU 21 executes the analysis of the plural impact signals acquired in step S101 for thereby obtaining the direction, to which the relevant impacts are applied, as impact-direction information. Thus, the ECU 21 is able to discriminate depending on presence-direction information and impact information to find whether the both directions fall in the substantially same direction. If the both directions are found to fall in the substantially same direction (with "YES" in step S107), the operation proceeds to step S109. In contrast, if the both directions are found not to fall in the substantially same direction (with "NO" in step S107), that is, when a direction in which the pedestrian has approached to the vehicle (at a front and right side thereof) and a direction (at a front and left side of the vehicle 10), in which the impact is applied to the vehicle 10 by a stationary object such as a standing timber, are different from one another, it can be judged that no direct relevance is involved in collision between the pedestrian, approaching to or in contact with the vehicle 10, and the impact signals detected by the physical quantity sensors 27a to 27c and the relevant pedestrian does not collide the vehicle 10. Thus, no particular need arises for deploying the air bag 70. Therefore, the pedestrian detecting operation is terminated.

In next step S109, discrimination is made to find whether the vehicle 10 is moving. That is, discrimination is made depending on the vehicle-wheel speed signal (vehicle information) acquired in step S101 to find whether the vehicle 10 is moving. If discrimination is made that the vehicle 10 is in motion, that is, moving (with "YES" in step S109), in consecutive step S111, the ECU 21 outputs a pedestrian collision signal (pedestrian collision information), indicative of the pedestrian encountering the collision, to the air bag device 70 for protecting the pedestrian that is deemed to encounter the collision with the vehicle 10. On the contrary, if no discrimination is made that the vehicle 10 is moving (with "NO" in step S109), the operation is executed to interrupt the pedestrian detecting operation to stop the function of the pedestrian detector 20 with a focus on a phase in which the vehicle 10 is moving.

In alternative, the ECU 21 may be configured to take a flow of operations such that no respective discriminating operations in steps S107 and S109 set forth above are dispensed with and, in next step, the operation is executed to output the pedestrian collision signal. That is, under circumstances where discrimination is made in response to temperature information in step S103, prior to those steps described above, that the detection object is a pedestrian (with "YES" in step S103) and another discrimination is made in step S105 that impact information is outputted (with "YES" in step S105), even if a stationary object, with a characteristic closely related to the pedestrian in terms of a mass and rigidity, encounters the collision, the presence of the operation in step S103 precludes the ECU 21 from discriminating in response to temperature information that such a stationary object is the pedestrian (with "NO" in step S103). Thus, even if no discriminating operations are executed based on steps S107 and S109, the collision encountered by the pedestrian can be reliably detected with no error in detection.

In consecutive step S111, the pedestrian collision signal is applied to the air bag device 50. Upon receipt of this signal, the air bag device 50 activates the engine-hood lift-up mechanism (not shown), while executing a deploying control of the air bag 70 to cause the air bag 70 to be deployed in a position inside or outside the lifted engine hood. This causes the air bag 70 to alleviate the impacts encountered by the relevant pedestrian who collides the vehicle 10.

As set forth above, with the pedestrian detection device 20, of the presently filed embodiment, applied to the air bag system for protecting the pedestrian, the infrared ray sensor 30A (the infrared ray sensors 30B and 30C) detects the temperature of the detection object approaching to or in contact with the vehicle 10 and outputs the temperature signal (temperature information), and the physical quantity sensors 27a to 27c detect the presence of the impacts applied to the vehicle 10 to output the impact signal (impact information). In this moment, the ECU 21 executes the pedestrian detecting operation in a way to perform a first discrimination in response to the temperature signal that the detection object is the pedestrian (with "YES" in step S103), a second discrimination that the impact signal is outputted (with "YES" in step S105), a third discrimination that the direction in which the pedestrian is present and the direction to which the impact is applied fall in the substantially same direction (with "YES" in step S107) and a fourth discrimination that the vehicle 10 is moving (with "YES" in step S109).

Depending on such discriminations, the ECU 21 outputs the pedestrian collision signal (as pedestrian collision information), indicative of the occurrence in which the pedestrian collides with the vehicle 10, to the air bag device 50 (in step S111). Thus, even if the stationary object, with the characteristic closely related to the pedestrian in terms of the mass and rigidity, collides the vehicle 10, no discrimination is made due to temperature information that such a stationary object is a pedestrian (with "NO" in step S103).

Also, in cases where the direction, in which the pedestrian approaches to the vehicle 10, and the direction, to which the impact is applied to the vehicle by the stationary object such as the standing timber, are different from one another, no discrimination is made that a presence-direction of the pedestrian and an impact-direction fall in the substantially same direction (with "NO" in step S107). Thus, the collision between the vehicle 10 and the pedestrian can be reliably detected.

Accordingly, the ECU 21 makes discrimination to find out the presence of or the absence of the collision between the vehicle 10 and the pedestrian depending on, in addition to the discriminations based on the signal waveforms outputted from the physical quantity sensors 27a to 27c, temperature information of the detection object detected by the infrared ray sensor 30A, presence-direction information of the detection object and directional information of the impacts applied by the detection object, thereby enabling the prevention of erroneous detection.

Also, in an alternative, the infrared ray sensor 30A and the physical quantity sensors 27a to 27c of the pedestrian detection device 20 may be mounted to the rear bumper 15 located in a rear position of the vehicle 10 and the air bag 70 is mounted to a rear area of the vehicle 10. With such an alternative structure, even in the occurrence of the collision between the pedestrian and the vehicle 10 during the movement thereof in a backward direction, the air bag 70 can be reliably deployed like in the structure of the air bag system mounted to the front area of the vehicle 10.

This provides a capability wherein even when the vehicle 10 moves backward and collides with the pedestrian, the deployed air bag 70 alleviates the impact being applied to the pedestrian who encounters the collision with the vehicle 10.

Another alternative may be configured in a structure wherein no discriminating operation of step S109 for the pedestrian detecting operation set forth above is executed and a operational flow is established to execute the operation to output the pedestrian collision signal in step S111.

More particularly, no discrimination is made in step S109 to find whether the vehicle 10 is moving and the operation is executed depending on temperature information, resulting from the execution of step S103 prior to step S109, to discriminate that the detection object is the pedestrian (with "YES" in step S103). Further, discrimination is made upon the execution of step S105 that impact information is outputted (with "YES" in step S105). Additionally, discrimination is made upon execution of step S107 that a direction in which the pedestrian is present and a direction to which the impact is applied to the vehicle fall in a substantially same direction (with "YES" in step S107).

Under such circumstances, a pedestrian collision signal is outputted to the air bag control device 50 in step S111 whereby when, for instance, a two-wheeled motor vehicle collides with the vehicle 10 during parking, a driver of the two-wheeled vehicle can be protected by the air bag 70 being deployed even though the driver is not a pedestrian.

While the specific embodiment of the present invention has been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the fill breadth of the following claims and all equivalents thereof.

For instance, an audible warning device or a visible warning device, mounted to the vehicle at a location inside thereof, may be combined with the pedestrian detection device of the presently filed embodiment to be activated in response to pedestrian collision information generated from the pedestrian detection device. Thus, a driver of the vehicle is able to receive audible or visible warning information during a collision with a pedestrian to take quick action for the pedestrian.

What is claimed is:

1. A pedestrian detection device adapted for installation on a vehicle for detecting a collision between the vehicle and a pedestrian, comprising:

an infrared ray sensor mounted on the vehicle for detecting a thermal energy resulting from heat rays radiated from a detection object approaching to or in contact with the vehicle to output temperature information related to the detection object;

a physical quantity sensor mounted on the vehicle to detect a physical quantity of an impact force exerted by the detection object in collision with the vehicle for generating impact information related to the physical quantity;

an impact information generation unit operative to make a first discrimination in response to the temperature information related to the detection object that the detection object is the pedestrian and a second discrimination in response to the impact information related to the physical quantity that the impact information is present, upon which the impact information generation unit generates pedestrian collision information indicative of the pedestrian encountered in the collision in the presence of both the first and second discriminations;

the infrared ray sensor includes presence-direction detecting means for detecting a first direction, in which the detection object is present, for outputting presence-direction information related to the first direction in which the detection object is present; and the physical quantity sensor includes a plurality of physical quantity detecting means for detecting a second direction of the impact force exerted by the detection object to generate impact-direction information related to the second direction of the exerted impact force; wherein the impact information generation unit is also operative to make, in addition to the first and second discriminations, a third discrimination in response to the presence-direction information and the impact-direction information for generating the pedestrian collision information when the first and second directions fall in a substantially same direction.

2. The pedestrian detection device according to claim 1, further comprising:

vehicle speed detection means for detecting a traveling speed of the vehicle to output vehicle speed information; and wherein the impact information generation unit is also operative to make, in addition to the first to third discriminations, a fourth discrimination in response to the vehicle speed information that the vehicle is traveling for thereby generating the pedestrian collision information.

3. The pedestrian detection device according to claim 1, wherein:
the temperature detector and the impact detector are mounted to at least one of a front area and a rear area of the vehicle.

4. The pedestrian detection device according to claim 3, wherein:
the impact detector includes a plurality of impact detection means mounted to a bumper of the vehicle at given positions thereof to detect impact forces applied thereto, respectively, for thereby outputting the impact information depending on detected impact forces.

5. The pedestrian detection device according to claim 4, wherein:
the impact detection means include physical quantity sensors, respectively, by which magnitudes of impact forces are detected.

6. A pedestrian detection device adapted for installation on a vehicle for detecting a collision between the vehicle and a pedestrian, comprising:
a plurality of infrared ray detecting means mounted on a bumper of the vehicle at plural positions along a lateral direction of the bumper for detecting a first direction indicative of the detection object being present, and for outputting presence-direction information related to the first direction;
a plurality of physical quantity detecting means mounted on the bumper of the vehicle at plural positions along the lateral direction of the bumper for detecting a second direction indicative of the impact force exerted by the detection object to generate impact-direction information related to the second direction of the exerted impact force; and
impact information generation means operative in response to the presence-direction information and the impact-direction information for generating pedestrian collision information when the first and second directions fall in a substantially same direction.

7. An air bag system for a vehicle comprising:
a pedestrian detection device installed on the vehicle for detecting a collision between the vehicle and a pedestrian to generate pedestrian collision information;
an air bag controller installed on the vehicle and generating an activation signal in response to the pedestrian collision information; and
an air bag installed on the vehicle to be deployed in response to the pedestrian collision information for alleviating an impact applied to the pedestrian;
wherein the pedestrian detection device comprises:
a plurality of presence-direction detecting means for detecting a first direction, in which a detection object is present, for outputting presence-direction information related to the first direction in which the detection object is present;
a plurality of physical quantity detecting means for detecting a second direction of the impact force exerted by the detection object to generate impact-direction information related to the second direction of the exerted impact force; and
an impact information generation unit operative to make a discrimination in response to the presence-direction information and the impact-direction information for generating the pedestrian collision information when the first and second directions fall in a substantially same direction.

8. A vehicle including the air bag system according to claim 7.

* * * * *